United States Patent
Wang et al.

(10) Patent No.: US 11,321,266 B2
(45) Date of Patent: May 3, 2022

(54) DUAL-MODE USB DEVICE

(71) Applicant: Norel Systems Limited, Tianjin (CN)

(72) Inventors: Yuanlong Wang, Tianjin (CN); Miao Chen, Tianjin (CN)

(73) Assignee: NOREL SYSTEMS LIMITED, Tianjin (CN)

( * ) Notice: Subject to any disclaimer, the term of this patent is extended or adjusted under 35 U.S.C. 154(b) by 6 days.

(21) Appl. No.: 17/130,520

(22) Filed: Dec. 22, 2020

(65) Prior Publication Data

US 2021/0124708 A1   Apr. 29, 2021

(30) Foreign Application Priority Data

Oct. 25, 2019   (CN) .......................... 201911021906.0

(51) Int. Cl.
*G06F 13/40* (2006.01)
*G06F 13/42* (2006.01)

(52) U.S. Cl.
CPC ...... *G06F 13/4068* (2013.01); *G06F 13/4204* (2013.01); *G06F 13/4282* (2013.01); *G06F 2213/0042* (2013.01)

(58) Field of Classification Search
CPC .................................................. G06F 13/385
See application file for complete search history.

(56) References Cited

U.S. PATENT DOCUMENTS 6,584,519 B1 *   6/2003   Russell ............... G06F 13/4045
                                                                  710/305
7,085,117 B2 *   8/2006   Bullock ................. H02H 9/005
                                                                  361/111

* cited by examiner

*Primary Examiner* — Henry Tsai
*Assistant Examiner* — Juanito Borromeo
(74) *Attorney, Agent, or Firm* — Locke Lord LLP; Tim Tingkang Xia, Esq.

(57) ABSTRACT

The present invention discloses a dual-mode USB device, which includes a USB2.0 controller, a dual-mode USB2.0 interface module and a USB interface. The dual-mode USB device alternatively works in a USB2.0 standard mode or a USB2.0 extended mode. In the USB2.0 standard mode, DP and DM signals of the USB2.0 interface are connected to a remote USB interface by DC coupling, and is compatible with remote devices using USB2.0 standard signals and protocols; in the USB2.0 extended mode, DP and DM signals of the USB2.0 interface are connected to the remote USB interface by AC coupling, which is compatible with remote devices supporting the USB2.0 extended mode.

13 Claims, 3 Drawing Sheets

DUAL-MODE USB DEVICE

CROSS-REFERENCE TO RELATED PATENT APPLICATION

This non-provisional application claims priority to and the benefit of, pursuant to 35 U.S.C. § 119(a), patent application Serial No. CN201911021906.0 filed in China on Oct. 25, 2019. The disclosure of the above application is incorporated herein in its entirety by reference.

TECHNICAL FIELD

The present invention relates to a dual-mode USB device, in particular to a technology compatible with DC coupling transmission and AC coupling transmission of USB2.0 signals between a near-end device and a remote-end device.

BACKGROUND

Universal Serial Bus in English, abbreviated as USB, is an interface technology widely used in PC field. The USB interface has the characteristics of fast transmission speed, supporting hot plug and connecting multiple devices at the same time. More and more application peripherals can be connected to personal computers with the same standard through the USB, including a USB hard disk, a USB optical drive, a USB mouse, a USB keyboard, a USB printer, a USB sound card, a USB network card, a USB camera, a USB video collector, a USB Ethernet adapter, etc. USB interfaces in the prior art include USB1.1, USB2.0 and the recent USB3.0/USB3.1, among which, USB1.1 and USB2.0 are based on half-duplex two-wire bus, which can only provide unidirectional data stream transmission at the same time. In theory, the transmission speed of USB1.1 can reach 12 megabits per second, while USB2.0 can reach 480 megabits per second, and can provide backwards compatibility with USB 1.1; among all kinds of USB interfaces, USB2.0 is the most widely used at present. The sending device and receiving device are USB2.0 hosts and USB2.0 devices respectively, which are connected by USB2.0 cables. When USB2.0 signals are transmitted through USB2.0 cables, the standard USB2.0 signals are transmitted by DC coupling. Depending on the DC voltage values on the DP and DM, there are strict requirements for the reference ground potential difference between sending and receiving equipment. The maximum transmission length of a USB2.0 cable is only 5 meters. At the same time, although USB2.0 hub connection can be used between the sending equipment and receiving equipment, at most, only 5-level hubs can be used, so the limitation of using distance restricts the application of USB2.0 to a great extent. At present, for long-distance data transmission applications, AC-coupled differential signal transmission is generally adopted, which can improve the anti-common mode interference ability of signals. The reference ground potential difference between sending and receiving equipment can be different, and the transmission distance can exceed 50 meters through data coding and decoding technology.

SUMMARY

Technical problems to be solved by the invention are as follows: the universality and universality of the USB interface are fully utilized, a dual-mode USB device is provided, and the same USB interface can be compatible with both remote equipment using USB2.0 standard signals and protocols and remote equipment supporting USB2.0 extended mode, so that the application range of the USB interface is expanded.

In order to solve the above technical problems, the technical solution adopted by the present invention is as follows:

The present invention provides a dual-mode USB device, comprising a USB2.0 controller, a dual-mode USB2.0 interface module and a USB interface, wherein, the USB interface comprises DP and DM signals, the USB2.0 controller is connected with the dual-mode USB2.0 interface module, the dual-mode USB2.0 interface module is connected with the USB interface, and the USB interface is connected with a remote USB interface of remote equipment, the USB2.0 controller conforms to a USB2.0 standard, and sends and receives USB data and status information through the dual-mode USB2.0 interface module, the dual-mode USB2.0 interface module alternatively works in a USB2.0 standard mode or a USB2.0 extended mode, in the USB2.0 standard mode, the DP and DM signals of the USB2.0 interface are connected with the remote USB interface by DC coupling, the dual-mode USB2.0 interface module sends and receives USB data and status information on a DP and a DM according to the USB2.0 standard, and is compatible with the remote equipment using USB2.0 standard signals and protocols, in the USB2.0 extended mode, the DP and DM signals of the USB2.0 interface are connected to the remote USB interface by AC coupling, and the dual-mode USB2.0 interface module receives USB data and status information generated by the USB2.0 controller, generates USB data packets and USB status packets and sends them to the remote equipment through DP and DM signals, the dual-mode USB2.0 interface module receives from the DP and DM signals the USB data packets and remote USB status packets sent by the remote equipment, generates USB data and status information and sends them to the USB2.0 controller, and is compatible with the remote equipment supporting the USB2.0 extended mode.

Preferably, the AC coupling is capacitive coupling or transformer coupling.

Preferably, the dual-mode USB2.0 interface module is configured to work in the USB2.0 standard mode or the USB2.0 extended mode through static signals.

Preferably, the dual-mode USB2.0 interface module is also connected with a mode control module, and the mode control module controls the dual-mode USB2.0 interface module to work in the USB2.0 standard mode or the USB2.0 extended mode alternatively.

Preferably, the mode control module is a register or a microprocessor.

Preferably, the USB interface also includes a USB mode negotiation signal, and the mode control module is also connected with the USB mode negotiation signal which is connected with the remote USB interface, the mode control module negotiates with the remote equipment through a USB mode negotiation protocol transmitted by the USB mode negotiation signal to determine and alternatively control the dual-mode USB2.0 interface module to work in the USB2.0 standard mode or the USB2.0 extended mode.

Preferably, the USB mode negotiation signal is a VBUS signal.

Preferably, the mode control module modulates the USB mode negotiation protocol into VBUS signals for transmission in by AC coupling.

Preferably, the USB2.0 controller is a USB2.0 host controller or a USB2.0 device controller, the remote equipment contains a USB2.0 device controller when the USB2.0 controller is a USB2.0 host controller, and the remote equipment contains a USB2.0 host controller when the USB2.0 controller is a USB2.0 device controller.

Preferably, the USB2.0 controller is connected with the dual-mode USB2.0 interface module through a parallel bus, the number of signal lines of the parallel bus is more than 2, and USB data and status information are transmitted between the USB2.0 controller and the dual-mode USB2.0 interface module through the parallel bus.

Preferably, the parallel bus is a UTMI bus or a ULPI bus.

Preferably, the USB2.0 controller is connected with the dual-mode USB2.0 interface module through INT_DP and INT_DM signals, sends and receives the USB data and status information through INT_DP and INT_DM, and the signals and protocols on the INT_DP and INT_DM conform to the USB2.0 standard, the dual-mode USB2.0 interface module also includes a USB status detection module, which detects the USB status information generated by the USB2.0 controller on the INT_DP and INT_DM to generate the USB status packets, the dual-mode USB2.0 interface module receives USB data generated by the USB2.0 controllers on the INT_DP and INT_DM and generates USB data packets, the USB data packets and USB status packets are sent to the remote equipment through the DP and DM signals by time division; in the USB2.0 extended mode, the dual-mode USB2.0 interface module receives remote USB data packets and remote USB status packets from the DP and DM signals, generates USB data and status information and sends them to the USB2.0 controller through the INT_DP and INT_DM with signals and protocols conforming to USB2.0 standard.

Preferably, when working in the USB2.0 extended mode, the dual-mode USB2.0 interface module transmits with the remote equipment on the DP and DM by time division, and the DP and DM work in a half-duplex mode.

The dual-mode USB device provided by the present invention has the beneficial effects that the same USB interface can be compatible with both remote equipment using USB2.0 standard signals and protocols and remote equipment supporting USB2.0 extended mode, so that the operation complexity and use cost of users are greatly reduced, and the application range of USB2.0 equipment is expanded.

BRIEF DESCRIPTION OF DRAWINGS

The present invention will be further explained with reference to the drawings and examples.

Figure 1:
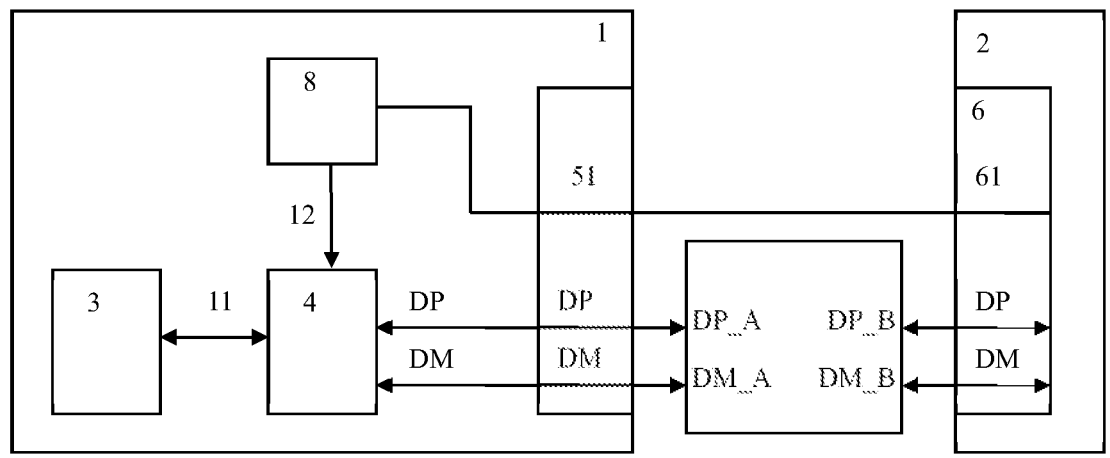
FIG. 1 is a block diagram and application diagram of a dual-mode USB device according to the present invention.

In which:

| | |
|---|---|
| 1 Dual-mode USB device | 2 Remote equipment |
| 3 USB2.0 Controller | 4 Dual Mode USB2.0 Interface Module |
| 5 USB interface | 6 Remote USB interface |
| 7 Signal coupling module | 8 Mode control module |
| 11 Controller bus | 12 USB mode selection signal |
| 41 USB2.0 standard mode interface module | |
| 42 USB2.0 extended mode interface module | |
| 421 USB status detection module | |
| 51 USB mode negotiation signal | |
| 61 Remote USB mode negotiation signal | |

DESCRIPTION OF EMBODIMENTS

A dual-mode USB device according to the present invention will be further explained with reference to the embodiments in the drawings.

As shown in FIG. 1, it is an embodiment of a dual-mode USB device according to the present invention. In this embodiment, a dual-mode USB device 1 includes a USB2.0 controller 3, a dual-mode USB2.0 interface module 4 and a USB interface 5.

The USB interface 5 includes DP and DM signals. The USB2.0 controller 3 is connected to the dual-mode USB2.0 interface module 4 through a controller bus 11. The DP and DM signals of the USB interface 5 are connected to DP and DM signals of a remote USB interface 6 of remote equipment 2 through a signal coupling module 7 by DC or AC coupling.

The USB2.0 controller 3 conforms to the USB2.0 standard and sends and receives USB data and status information through the dual-mode USB2.0 interface module 4.

The dual-mode USB2.0 interface module 4 can alternatively work in the USB2.0 standard mode or the USB2.0 extended mode.

Under the USB2.0 standard mode, the DP and DM signals of the USB2.0 interface are connected to the remote USB interface 6 by DC coupling, and the dual-mode USB2.0 interface module 4 sends and receives USB data and status information on the DP and DM according to the USB2.0 standard, which is compatible with the remote equipment 2 using USB2.0 standard signals and protocols.

In USB2.0 extended mode, the DP and DM signals of the USB2.0 interface are connected to the remote USB interface 6 by AC coupling, the dual-mode USB2.0 interface module 4 receives USB data and status information generated by the USB2.0 controller 3, generates USB data packets and USB status packets and sends them to the remote equipment 2 through the DP and DM signals; the dual-mode USB2.0 interface module 4 receives remote USB data packets and remote USB status packets sent by the remote equipment 2 from the DP and DM signals, generates USB data and status information, and sends them to the USB2.0 controller 3, which is compatible with the remote equipment 2 supporting the USB2.0 extended mode.

In this embodiment, the USB interface 5 is connected to the remote USB interface 6 through the signal coupling module 7. DP_A and DM_A signals in the signal coupling module 7 are connected to the DP and DM signals of the USB interface 5, while the DP_B and DM_B signals in the signal coupling module 7 are connected to the DP and DM signals of the remote USB interface 6.

Figure 4:
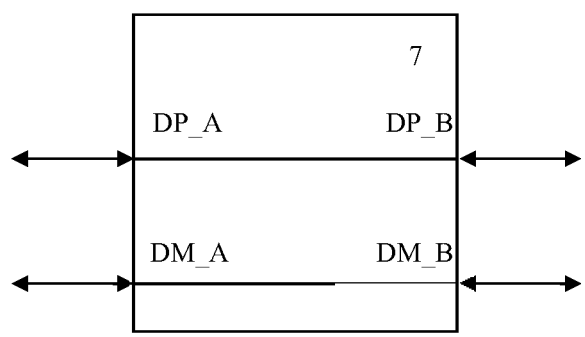
FIG. 4 is a schematic diagram of a dual-mode USB device according to the present invention, in which DP and DM signals of the USB interface are connected to a remote USB interface by DC coupling.

When dual-mode USB2.0 interface module 4 works in the USB2.0 standard mode, the DP and DM signals of the USB interface 5 are connected to the DP and DM signals of the remote USB interface 6 by DC coupling as shown in FIG. 4. As shown in FIG. 4, the DP_A signal is directly connected to the DP_B signal and the DM_A signal is directly connected to the DM_B signal. When the signal coupling module 7 is DC coupling as shown in FIG. 4, the signal coupling module 7 can be implemented by a cable.

Figure 5:
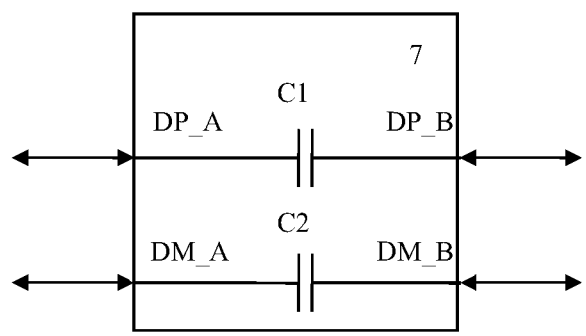
FIG. 5 is a schematic diagram of a dual-mode USB device according to the present invention, in which DP and DM signals of the USB interface are connected to a remote USB interface by AC capacitive coupling.

When the dual-mode USB2.0 interface module 4 works in the USB2.0 extended mode, the DP and DM signals of the USB interface 5 can be connected to the DP and DM signals of the remote USB interface 6 by AC capacitor coupling as shown in FIG. 5. As shown in FIG. 5, the DP_A signal is connected to the DP_B signal through a capacitor C1 and the DM_A signal is connected to the DM_B signal through a capacitor C2. When the signal coupling module 7 is AC capacitor coupling as shown in FIG. 5, the signal coupling module 7 can be implemented by a cable with the capacitors C1 and C2 connected in series.

Figure 6:
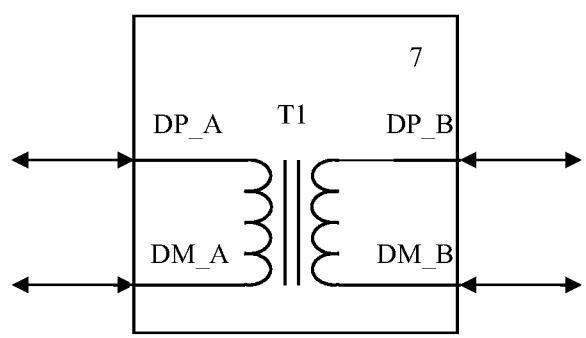
FIG. 6 is a schematic diagram of a dual-mode USB device according to the present invention, in which DP and DM signals of the USB interface are connected to a remote USB interface by AC transformer coupling.

When the dual-mode USB2.0 interface module 4 works in the USB2.0 extended mode, the DP and DM signals of the USB interface 5 can also be connected to the DP and DM signals of the remote USB interface 6 by AC transformer coupling as shown in FIG. 6, and the DP_A and DM_A signals are connected to the DP_B and DM_B signals through a transformer T1 as shown in FIG. 6. When the signal coupling module 7 is an AC transformer coupling as shown in FIG. 6, the signal coupling module 7 can be implemented by a cable connected with a transformer T1 in series.

In this embodiment, the dual-mode USB device 1 may or may not include the mode control module 8. When the dual-mode USB device 1 does not include the mode control module 8, the dual-mode USB2.0 interface module 4 can be connected with a static signal through the USB mode selection signal 12, and configured to work in the USB2.0 standard mode or the USB2.0 extended mode through the static signal, which can be generated by a switch or button included in the dual-mode USB device, or by being connected to a high level or a low level.

The dual-mode USB2.0 interface module 4 can also be connected with the mode control module 8 through the USB mode selection signal 12, and the mode control module 8 controls the dual-mode USB2.0 interface module 4 to work in either the USB2.0 standard mode or the USB2.0 extended mode.

In this embodiment, the mode control module 8 can be a register or a microprocessor.

In this embodiment, the USB interface 5 may also include a USB mode negotiation signal 51, which is connected to a remote USB mode negotiation signal 61 of the remote USB interface 6. The mode control module 8 transmits a USB mode negotiation protocol to negotiate with the remote device 2 through the USB mode negotiation signal 51, and determines and alternatively controls the dual-mode USB2.0 interface module 4 to work in the USB2.0 standard mode or the USB2.0 extended mode.

In this embodiment, the USB mode negotiation signal 51 may be a VBUS signal of the USB interface. In the USB standard, a VBUS is used to transmit power. At the same time, the mode control module 8 can modulate the USB mode negotiation protocol to the VBUS signal for transmission by AC coupling. In a USB Power Delivery standard, the mode of transmitting Power Delivery protocol by modulating a BFSK signal to a VBUS through AC coupling is announced. In this embodiment, the same or similar AC coupling method can be used to modulate the USB mode negotiation protocol to the VBUS signal for transmission.

In this embodiment, when the USB interface 5 is a USB Type C interface, the USB mode negotiation signal 51 can also be CC1 and CC2 signals of the USB Type C interface, and the remote USB interface 6 is also a USB Type C interface. The mode control module 8 negotiates with the remote equipment 2 through the CC1 and CC2 signal transmission USB mode negotiation protocol of the USB interface 5, and determines and alternatively controls the dual-mode USB2.0 interface module 4 to work in the USB2.0 standard mode or the USB2.0 extended mode.

In this embodiment, the USB2.0 controller 3 is a USB2.0 host controller or a USB2.0 device controller. When the USB2.0 controller 3 is a USB2.0 host controller, the remote device 2 contains a USB2.0 device controller. When the USB2.0 controller 3 is a USB2.0 device controller, the remote device 2 contains a USB2.0 host controller.

Figure 2:
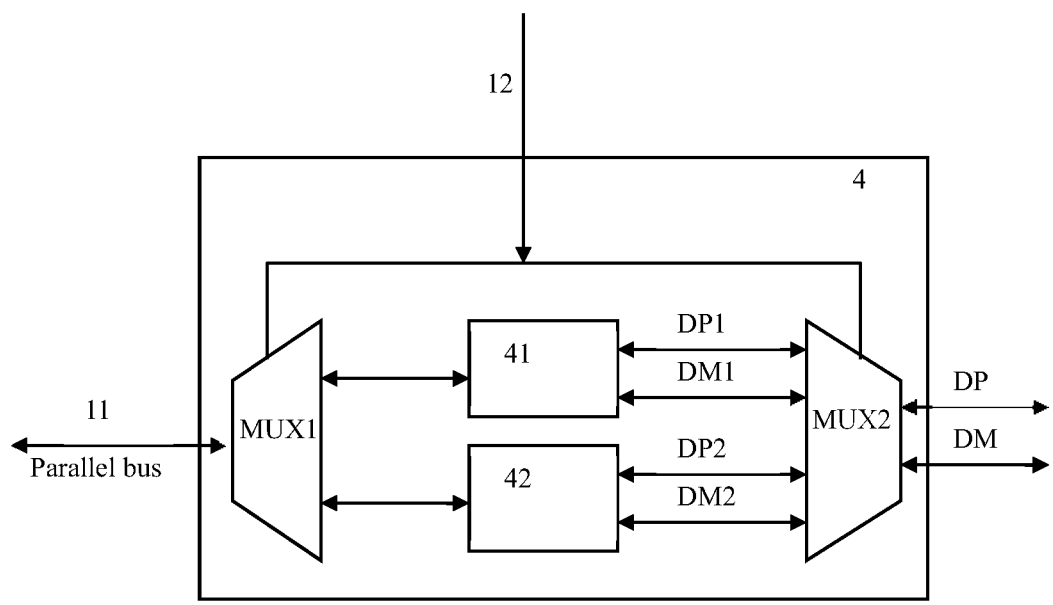
FIG. 2 is a block diagram and connection diagram of a dual-mode USB2.0 interface module included in a dual-mode USB device of the present invention.

As shown in FIG. 2, the controller bus 11 can be a parallel bus, and the USB2.0 controller 3 is connected with the dual-mode USB2.0 interface module 4 through the parallel bus. The number of signal lines of the parallel bus is greater than 2, and USB data and status information are transmitted between the USB2.0 controller 3 and the dual-mode USB2.0 interface module 4 through the parallel bus.

The parallel bus can be a UTMI bus or a ULPI bus.

In the USB2.0 standard, standard USB protocol packages are defined, including IN, OUT, SOF, SETUP, DATA0, DATA1, DATA2, MDATA, ACK, NAK, STALL, NYET, PRE, ERR, SPLIT, PING, etc. In this embodiment, the standard USB protocol package defined in the USB2.0 standard protocol is called USB data. The USB data contains some or all of the above standard USB protocol packages.

In the USB2.0 standard, by controlling the pull-up and pull-down resistance values, full-speed or high-speed working state, whether the transmitter is driven, etc. in the transceiver connected with the DP and DM signals, handshake protocols such as USB connection, disconnection, RESET, SUSPEND, WAKEUP, and J/K transmission can be realized. In this embodiment, the status and functions of the transceiver and the handshake protocol implemented are called USB status information or simply referred to as status information. The USB status information includes the status and functions of some or all of the transceivers mentioned above, and the handshake protocol implemented.

As shown in FIG. 2, the USB2.0 controller 3 is connected with the dual-mode USB2.0 interface module 4 through a parallel bus, and the USB interface 5 is connected with the dual-mode USB2.0 interface module 4 through DP and DM signals. The dual-mode USB2.0 interface module 4 includes a USB2.0 standard mode interface module 41, a USB2.0 extended mode interface module 42, a signal selector MUX1 and a signal selector MUX2, and the parallel bus is connected to the USB2.0 standard mode interface module 41 or the USB2.0 extended mode interface module 42 through the signal selector MUX1, while the DP and DM signals are connected to the DP1 and DM1 signals of the USB2.0 standard mode interface module 41 or the DP2 and DM2 signals of USB2.0 extended mode interface module 42 through the signal selector MUX2. The control terminal of the signal selector MUX1 and the signal selector MUX2 is a USB mode selection signal 12.

In the USB2.0 standard mode, the USB mode selection signal 12 controls the signal selector MUX1 to connect the parallel bus to the USB2.0 standard mode interface module 41, and disconnect the parallel bus from the USB2.0 extended mode interface module 42. The USB mode selection signal 12 also controls the signal selector MUX2 to connect DP and DM signals to DP1 and DM1 signals, and to disconnect DP and DM signals from DP2 and DM2 signals.

The USB2.0 standard mode interface module 41 in FIG. 2 converts USB data and status information on the parallel bus into USB2.0 standard signals and protocols transmitted on DP1 and DM1 signals, and communicates with the remote equipment 2 using USB2.0 standard signals and protocols through the DP and DM. FIG. 2 shows that the USB2.0 standard mode interface module 41 can be a standard USB2.0 physical layer module, and the parallel bus is a USB2.0 physical layer UTMI bus or a ULPI bus.

In the USB2.0 extended mode, the USB mode selection signal 12 controls the signal selector MUX1 to connect the parallel bus to the USB2.0 extended mode interface module 42, and disconnect the parallel bus from the USB2.0 standard mode interface module 41. The USB mode selection signal 12 also controls the signal selector MUX2 to connect the DP and DM signals to the DP2 and DM2 signals, and to disconnect the DP and DM signals from the DP1 and DM1 signals.

The USB2.0 extended mode interface module 42 shown in FIG. 2 receives the USB data and status information generated by the USB2.0 controller 3 from the parallel bus, generates USB2.0 extended mode USB data packets and USB status packets, and sends them to the remote equipment 2 using the USB2.0 extended mode via DP and DM through DP2 and DM2 signals. The USB2.0 extended mode interface module 42 receives the USB2.0 extended mode remote USB data packet and remote USB status packet sent by the remote equipment 2 from the DP2 and DM2 signals, generates USB data and status information, and sends them to the USB2.0 controller 3 through the parallel bus.

The above USB data packets and USB status packets are high-speed data transmitted on DP and DM signals in USB2.0 extended mode, which is different from USB2.0 standard signals and protocols.

In USB2.0 standard signal and protocol, the USB data is high-speed data, while USB status information is low-speed data, static level value or static data reflecting static level value. When transmitted through the DP and DM, the USB2.0 standard signal and USB status information in the protocol can only be transmitted through DC coupling connection. In the USB2.0 extended mode, the connection between the DP and DM is AC coupling, and the USB status information cannot be directly transmitted on AC-coupled DP and DM. Therefore, in the USB2.0 extended mode, the USB2.0 extended mode interface module 42 shown in FIG. 2 receives USB data and status information generated by the USB2.0 controller 3 from the parallel bus, and generates USB data packets and USB status packets in the USB2.0 extended mode; the USB data packets contain USB data, the USB status packets contain USB status information, and the USB data packets and USB status packets are encoded and suitable for transmission through AC coupling connection. The USB2.0 extended mode interface module 42 shown in FIG. 2 receives the USB2.0 extended mode remote USB data packets and the remote USB status packets sent by the remote equipment 2, generates USB data and status information, and sends them to the USB2.0 controller 3 through the parallel bus. The remote USB data packets and the remote USB status packets respectively contain USB data and status information generated by the USB2.0 controller in the remote equipment 2, and are encoded and suitable for transmission through AC coupling connection.

Figure 3:
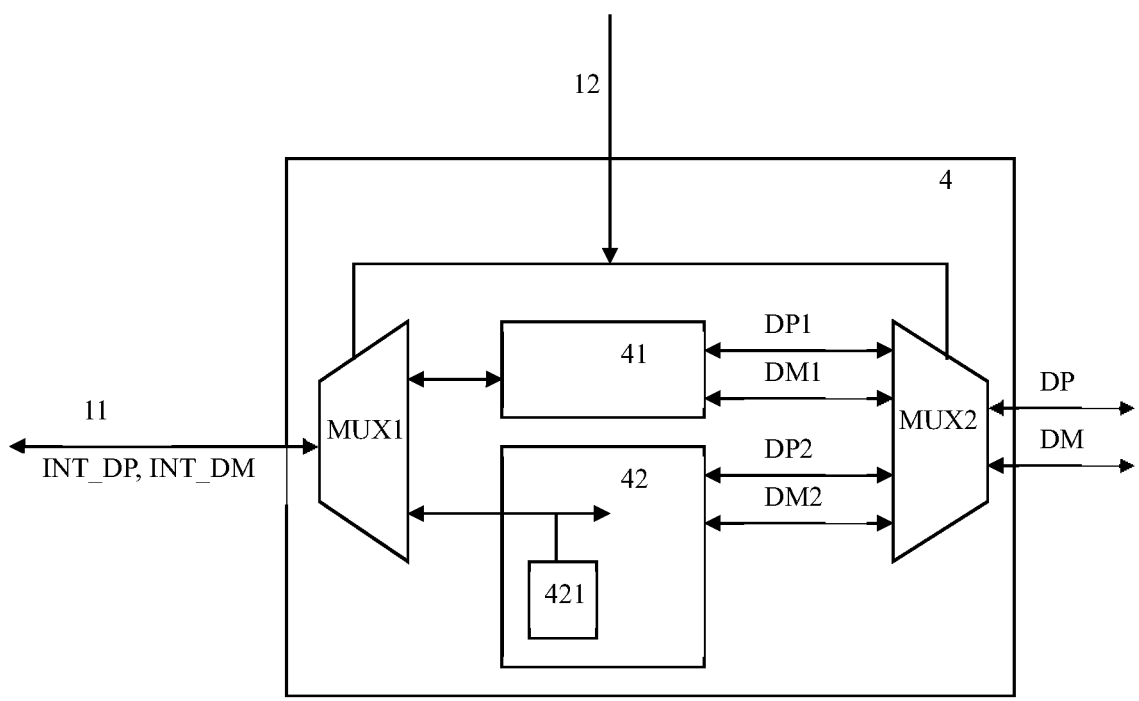
FIG. 3 is a block diagram and connection diagram of another dual-mode USB2.0 interface module included in a dual-mode USB device of the present invention.

As shown in FIG. 3, the controller bus 11 can also be INT_DP and INT_DM signals. The USB2.0 controller 3 is connected with the dual-mode USB2.0 interface module 4 through INT_DP and INT_DM signals, and sends and receives USB data and status information through the INT_DP and INT_DM. The signals and protocols on INT_DP and INT_DM conform to the USB2.0 standard.

As shown in FIG. 3, the USB2.0 controller 3 is connected with the dual-mode USB2.0 interface module 4 through INT_DP and INT_DM signals, the USB interface 5 is connected with the dual-mode USB2.0 interface module 4 through the DP and DM signals. The dual-mode USB2.0 interface module 4 includes a USB2.0 standard mode interface module 41, a USB2.0 extended mode interface module 42, a signal selector MUX1 and a signal selector MUX2, wherein INT_DP and INT_DM signals are connected to the USB2.0 standard mode interface module 41 or the USB2.0 extended mode interface module 42 through the signal selector MUX1, and he DP and DM signals are connected to the DP1 and DM1 signals of the USB2.0 standard mode interface module 41 or the DP2 and DM2 signals of the USB2.0 extended mode interface module 42 through the signal selector MUX2. The control terminals of the signal selector MUX1 and the signal selector MUX2 are USB mode selection signals 12.

In the USB2.0 standard mode, the USB mode selection signal 12 controls the signal selector MUX1 to connect INT_DP and INT_DM signals to USB2.0 standard mode interface module 41 and disconnect INT_DP and INT_DM signals from USB2.0 extended mode interface module 42. The USB mode selection signal 12 simultaneously controls the signal selector MUX2 to connect DP and DM signals to DP1 and DM1 signals and disconnect DP and DM signals from DP2 and DM2 signals.

As the signals and protocols on INT_DP and INT_DM conform to the USB2.0 standard, the interface module 41 of USB2.0 standard mode shown in FIG. 3 can directly connect the INT_DP and INT_DM signals through the MUX1 to DP1 and DM1 signals and connect the DP and DM through the MUX2. In the USB2.0 extended mode, the USB mode selection signal 12 controls the signal selector MUX1 to connect INT_DP and INT_DM signals to the USB2.0 extended mode interface module 42 and disconnect INT_DP and INT_DM signals from the USB2.0 standard mode interface module 41. The USB mode selection signal 12 also controls signal the selector MUX2 to connect DP and DM signals to DP2 and DM2 signals and disconnect DP and DM signals from DP1 and DM1 signals.

In USB2.0 standard signal and protocol, when transmitted through INT_DP and INT_DM, the USB data is high-speed data, while the USB status information is low-speed data or static level value.

As shown in FIG. 3, the USB2.0 extended mode interface module 42 also includes a USB state detection module 421. In the USB2.0 extended mode, the USB state detection module 421 detects the USB state information generated by the USB2.0 controller 3 on INT_DP and INT_DM to generate the USB state packets. The USB state detection module 421 may include all or part of the USB2.0 standard link layer functions for tracking and detecting USB state information. The USB2.0 extended mode interface module 42 receives USB data generated by the USB2.0 controller 3 on INT_DP and INT_DM and generates USB data packets. The USB data packets and USB status packets are sent to the remote equipment 2 through DP2 and DM2 signals in a time-division manner. In the USB2.0 extended mode, the USB2.0 extended mode interface module 42 shown in FIG. 3 receives remote USB data packets and remote USB status packets from the DP and DM signals, generates USB data and status information, and sends them to the USB2.0 controller 3 through INT_DP and INT_DM with signals and protocols conforming to the USB2.0 standard. The USB data packet contains USB data, the USB status packet contains USB status information, and the USB data packet and USB status packet are encoded and suitable for transmission through AC coupling connection. The remote USB data packet and the remote USB status packet respectively contain USB data and status information generated by the USB2.0 controller in the remote equipment 2, and are encoded and suitable for transmission through AC coupling connection.

When the USB data packets and the USB status packets are encoded, the above coding include but are not limited to 4b/5b coding, 8b/10b coding, 64b/66b coding, 128b/130b coding, random scrambling, etc. The encoded USB data packets and USB status packets and the remote USB data packets and remote USB status packets are suitable for transmission through AC coupling, which can improve the anti-common mode interference ability and make the signals more suitable for long-distance transmission.

Two embodiments of the dual-mode USB2.0 interface module 4 are shown in FIG. 2 and FIG. 3. In actual applications, the dual-mode USB2.0 interface module 4 can also be implemented in other ways. In FIG. 2 and FIG. 3, the USB2.0 standard mode and the USB2.0 extended mode can be alternatively selected by means of signal selectors MUX1 and MUX2. In FIG. 2 and FIG. 3, the MUX1 is placed at the connection with the controller bus 11. In other implementations, the function of the MUX1 can be realized by other circuit forms, and the position for realizing the function of the MUX1 can be different. In FIG. 2 and FIG. 3, the MUX2 is placed at the connection with DP and DM signals of the USB interface 5. In other implementations, the function of the MUX2 can be realized by other circuit forms, and the positions for realizing the function of the MUX2 can be different. Further, the USB2.0 standard mode interface module 41 or the USB2.0 extended mode interface module 42 need not be completely separated from FIG. 2 and FIG. 3 in implementation, and the USB2.0 standard mode interface module 41 or the USB2.0 extended mode interface module 42 can share common functional modules.

In this embodiment, when the dual-mode USB2.0 interface module 4 works in the USB2.0 extended mode, it transmits with the remote device 2 on the DP and DM by time division, and the DP and DM work in a half-duplex mode.

According to the dual-mode USB device, the universality and universality of the USB interface are fully utilized, and the same USB interface can be compatible with both remote equipment using USB2.0 standard signals and protocols and remote equipment supporting USB2.0 extended mode, so that the operation complexity and use cost of users are greatly reduced, and the application range of USB2.0 equipment is expanded.

The above is only a preferred embodiment of the present invention, and does not limit the present invention in any form. The scope of protection requested by the present invention shall be subject to the contents recorded in the claims. All simple changes, equivalent substitutions or decomposition and combination made to the above specific embodiments according to the technical essence of the present invention still fall within the scope of protection requested by the technical solution of the present invention.

What is claimed is:

1. A dual-mode USB device, comprising a USB2.0 controller, a dual-mode USB2.0 interface module and a USB interface, wherein, the USB interface comprises DP and DM signals, the USB2.0 controller is connected with the dual-mode USB2.0 interface module, the dual-mode USB2.0 interface module is connected with the USB interface, and the USB interface is connected with a remote USB interface of remote equipment, the USB2.0 controller conforms to a USB2.0 standard, and sends and receives USB data and status information through the dual-mode USB2.0 interface module, the dual-mode USB2.0 interface module alternatively works in a USB2.0 standard mode or a USB2.0 extended mode, in the USB2.0 standard mode, the DP and DM signals of the USB2.0 interface are connected with the remote USB interface by DC coupling, the dual-mode USB2.0 interface module sends and receives USB data and status information on a DP and a DM according to the USB2.0 standard, and is compatible with the remote equipment using USB2.0 standard signals and protocols, in the USB2.0 extended mode, the DP and DM signals of the USB2.0 interface are connected to the remote USB interface by AC coupling, and the dual-mode USB2.0 interface module receives USB data and status information generated by the USB2.0 controller, generates USB data packets and USB status packets and sends them to the remote equipment through DP and DM signals, the dual-mode USB2.0 interface module receives from the DP and DM signals the USB data packets and remote USB status packets sent by the remote equipment, generates USB data and status information and sends them to the USB2.0 controller, and is compatible with the remote equipment supporting the USB2.0 extended mode.

2. The dual-mode USB device according to claim 1, wherein, the AC coupling is capacitive coupling or transformer coupling.

3. The dual-mode USB device according to claim 1, wherein, the dual-mode USB2.0 interface module is configured to work in the USB2.0 standard mode or the USB2.0 extended mode through static signals.

4. The dual-mode USB device according to claim 1, wherein, the dual-mode USB2.0 interface module is also connected with a mode control module, and the mode control module controls the dual-mode USB2.0 interface module to work in the USB2.0 standard mode or the USB2.0 extended mode alternatively.

5. The dual-mode USB device according to claim 4, wherein, the mode control module is a register or a microprocessor.

6. The dual-mode USB device according to claim 4, wherein, the USB interface also includes a USB mode negotiation signal, and the mode control module is also connected with the USB mode negotiation signal which is connected with the remote USB interface, the mode control module negotiates with the remote equipment through a USB mode negotiation protocol transmitted by the USB mode negotiation signal to determine and alternatively control the dual-mode USB2.0 interface module to work in the USB2.0 standard mode or the USB2.0 extended mode.

7. The dual-mode USB device according to claim 6, wherein,
the USB mode negotiation signal is a VBUS signal.

8. The dual-mode USB device according to claim 7, wherein,
the mode control module modulates the USB mode negotiation protocol into VBUS signals for transmission in by AC coupling.

9. The dual-mode USB device according to claim 1, wherein,
the USB2.0 controller is a USB2.0 host controller or a USB2.0 device controller,
the remote equipment contains a USB2.0 device controller when the USB2.0 controller is a USB2.0 host controller, and the remote equipment contains a USB2.0 host controller when the USB2.0 controller is a USB2.0 device controller.

10. The dual-mode USB device according to claim 1, wherein,
the USB2.0 controller is connected with the dual-mode USB2.0 interface module through a parallel bus, the number of signal lines of the parallel bus is more than 2, and USB data and status information are transmitted between the USB2.0 controller and the dual-mode USB2.0 interface module through the parallel bus.

11. The dual-mode USB device according to claim 10, wherein,
the parallel bus is a UTMI bus or a ULPI bus.

12. The dual-mode USB device according to claim 1, wherein,
the USB2.0 controller is connected with the dual-mode USB2.0 interface module through INT_DP and INT_DM signals, sends and receives the USB data and status information through INT_DP and INT_DM, and the signals and protocols on the INT_DP and INT_DM conform to the USB2.0 standard,
the dual-mode USB2.0 interface module also includes a USB status detection module, which detects the USB status information generated by the USB2.0 controller on the INT_DP and INT_DM to generate the USB status packets, the dual-mode USB2.0 interface module receives USB data generated by the USB2.0 controllers on the INT_DP and INT_DM and generates USB data packets, the USB data packets and USB status packets are sent to the remote equipment through the DP and DM signals by time division; in the USB2.0 extended mode, the dual-mode USB2.0 interface module receives remote USB data packets and remote USB status packets from the DP and DM signals, generates USB data and status information and sends them to the USB2.0 controller through the INT_DP and INT_DM with signals and protocols conforming to USB2.0 standard.

13. The dual-mode USB device according to claim 1, wherein,
when working in the USB2.0 extended mode, the dual-mode USB2.0 interface module transmits with the remote equipment on the DP and DM by time division, and the DP and DM work in a half-duplex mode.

* * * * *